(12) United States Patent
Massot et al.

(10) Patent No.: US 7,823,913 B2
(45) Date of Patent: Nov. 2, 2010

(54) CURTAIN AIR BAG UNIT

(75) Inventors: Felix Massot, Mauquenchy (FR);
Thomas Siewiera, Diesen (FR); David L. Dominissini, Allen Park, MI (US)

(73) Assignee: Autoliv ASP, Inc., Ogden, UT (US)

( * ) Notice: Subject to any disclaimer, the term of this patent is extended or adjusted under 35 U.S.C. 154(b) by 180 days.

(21) Appl. No.: 11/795,928

(22) PCT Filed: Feb. 3, 2005

(86) PCT No.: PCT/US2005/003269

§ 371 (c)(1),
(2), (4) Date: Oct. 27, 2008

(87) PCT Pub. No.: WO2006/083246

PCT Pub. Date: Aug. 10, 2006

(65) Prior Publication Data

US 2009/0309339 A1    Dec. 17, 2009

(51) Int. Cl.
*B60R 21/16* (2006.01)
*B60R 21/213* (2006.01)

(52) U.S. Cl. .................. 280/730.2; 280/743.2

(58) Field of Classification Search ............. 280/728.2, 280/730.2, 743.2; 74/502.4, 502.6, 504–506, 74/508, 509, 510; 24/71.1; 242/388.2, 417, 242/417.3; 248/493, 498, 60, 316.7; 254/93 HP, 254/213, 517, 218, 219, 231–236, 237–242
See application file for complete search history.

(56) References Cited

U.S. PATENT DOCUMENTS

| | | | | |
|---|---|---|---|---|
| 974,739 A | * | 11/1910 | Newland | ............... 312/114 |
| 1,570,291 A | * | 1/1926 | Alstine | ............... 242/388.4 |
| 2,484,957 A | * | 10/1949 | Parks | ............... 254/231 |
| 2,710,998 A | * | 6/1955 | Meighan et al. | ............... 24/68 B |
| 2,944,788 A | * | 7/1960 | Schaefer | ............... 254/213 |
| 3,774,936 A | | 11/1973 | Barnett | |
| D265,171 S | * | 6/1982 | Zukaitis | ............... D8/44 |
| 4,700,434 A | * | 10/1987 | Fambrough | ............... 242/388.2 |
| 5,232,244 A | | 8/1993 | Itoh | |

(Continued)

OTHER PUBLICATIONS

Decision of Petition dated May 28, 2010 in U.S. Appl. No. 11/593,282, scheduled to issue as U.S. Patent No. 7,748,741 on Jul. 6, 2010 (1 pg.).

(Continued)

*Primary Examiner*—Faye M. Fleming
*Assistant Examiner*—Joseph Rocca
(74) *Attorney, Agent, or Firm*—Sally J Brown; Stoel Rives LLP

(57) ABSTRACT

Curtain air bag unit for a motor vehicle is provided which comprises an air bag extending parallel to the longitudinal axis of the motor vehicle. Further it comprises fixing means for fixing the air bag in the area of the roof bar of the motor vehicle, whereby the fixing means comprise a tension member, that extends from a first fixing element to a second fixing element. It also comprises tensioning means for influencing the tensile stress of the tension member during mounting of the curtain air bag unit into the motor vehicle. A pre-cut tension member can be used whose length is chosen in a way that the mounting in the vehicle can be carried out simply and conveniently.

22 Claims, 7 Drawing Sheets

U.S. PATENT DOCUMENTS

Figure 7A:
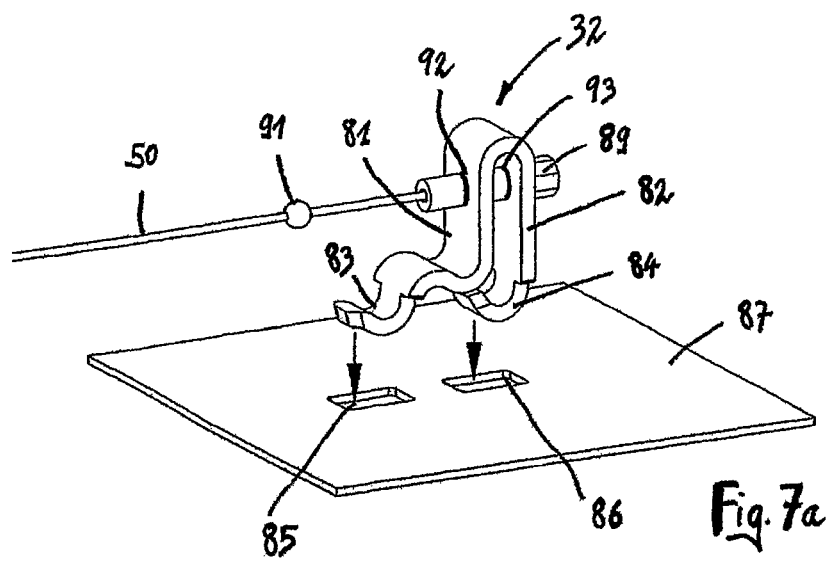

| | | | |
|---|---|---|---|
| 5,462,308 | A | 10/1995 | Seki et al. |
| 5,899,486 | A * | 5/1999 | Ibe ..................... 280/728.2 |
| 6,135,497 | A | 10/2000 | Sutherland et al. |
| 6,464,250 | B1 | 10/2002 | Faigle et al. |
| 6,494,486 | B2 | 12/2002 | Pausch et al. |
| 7,165,783 | B2 | 1/2007 | Karlbauer et al. |
| 7,172,212 | B2 | 2/2007 | Aoki et al. |
| 7,712,774 | B2 | 5/2010 | Garner et al. |
| 7,748,741 | B2 * | 7/2010 | Mitchell et al. ......... 280/743.2 |
| 2002/0175502 | A1 | 11/2002 | Tesch et al. |
| 2003/0116946 | A1 | 6/2003 | Roos |
| 2004/0140653 | A1 | 7/2004 | Bossecker et al. |
| 2008/0106073 | A1 | 5/2008 | Garner et al. |
| 2008/0106084 | A1 | 5/2008 | Mitchell et al. |

OTHER PUBLICATIONS

Petition to Revive an Abandoned Application dated Apr. 15, 2010 in U.S. Appl. No. 11/593,282, scheduled to issue as U.S. Patent No. 7,748,741 on Jul. 6, 2010 (2 pgs.).

Notice of Allowance dated Dec. 11, 2009 in U.S. Appl. No. 11/593,282, scheduled to issue as U.S. Patent No. 7,748,741 on Jul. 6, 2010 (4 pgs.).

Supplemental Response to Office Action dated Oct. 29, 2009 in U.S. Appl. No. 11/593,282, scheduled to issue as U.S. Patent No. 7,748,741 on Jul. 6, 2010 (5 pgs.).

Interview Summary dated Oct. 19, 2009 in U.S. Appl. No. 11/593,282, scheduled to issue as U.S. Patent No. 7,748,741 on Jul. 6, 2010 (3 pgs.).

Amendment and Response dated Sep. 22, 2009 in U.S. Appl. No. 11/593,282, scheduled to issue as U.S. Patent No. 7,748,741 on Jul. 6, 2010 (13 pgs.).

Office Action dated Apr. 29, 2009 in U.S. Appl. No. 11/593,282, scheduled to issue as U.S. Patent No. 7,748,741 on Jul. 6, 2010 (7 pgs.).

Response to Election of Species dated Mar. 4, 2009 in U.S. Appl. No. 11/593,282, scheduled to issue as U.S. Patent No. 7,748,741 on Jul. 6, 2010 (11 pgs.).

Office Action dated Feb. 12, 2009 in U.S. Appl. No. 11/593,282, scheduled to issue as U.S. Patent No. 7,748,741 on Jul. 6, 2010 (5 pgs.).

Notice of Allowance dated Jan. 11, 2010 in U.S. Appl. No. 11/593,426, now U.S. Patent No. 7,712,774 (4 pgs.).

Decision on Petition dated Dec. 22, 2009 in U.S. Appl. No. 11/593,426, now U.S. Patent No. 7,712,774 (2 pgs.).

Petition to Withdraw a Terminal Disclaimer dated Nov. 2, 2009 in U.S. Appl. No. 11/593,426, now U.S. Patent No. 7,712,774 (22 pgs.).

Supplemental Amendment and Response dated Nov. 2, 2009 in U.S. Appl. No. 11/593,426, now U.S. Patent No. 7,712,774 (13 pgs.).

Interview Summary dated Oct. 19, 2009 in U.S. Appl. No. 11/593,426, now U.S. Patent No. 7,712,774 (3 pgs.).

Amendment and Response dated Sep. 8, 2009 in U.S. Appl. No. 11/593,426, now U.S. Patent No. 7,712,774 (10 pgs.).

Office Action dated Mar. 9, 2009 in U.S. Appl. No. 11/593,426, now U.S. Patent No. 7,712,774 (7 pgs.).

* cited by examiner

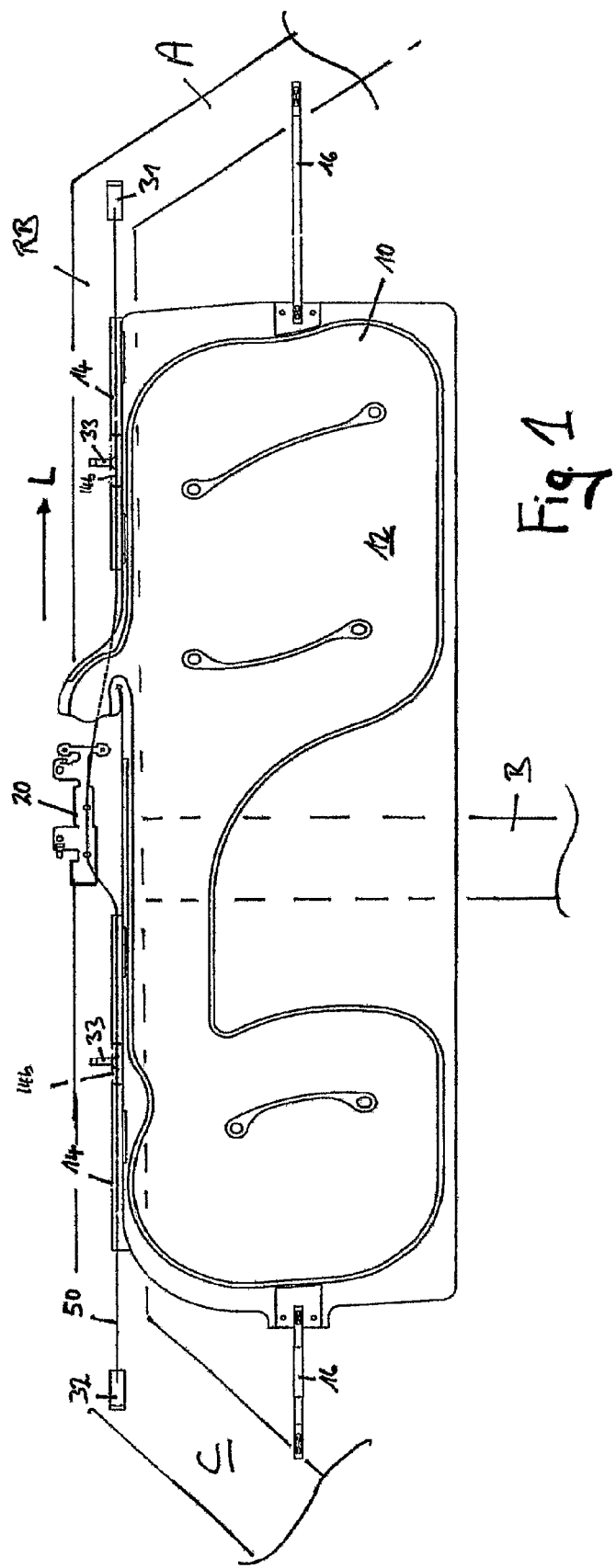

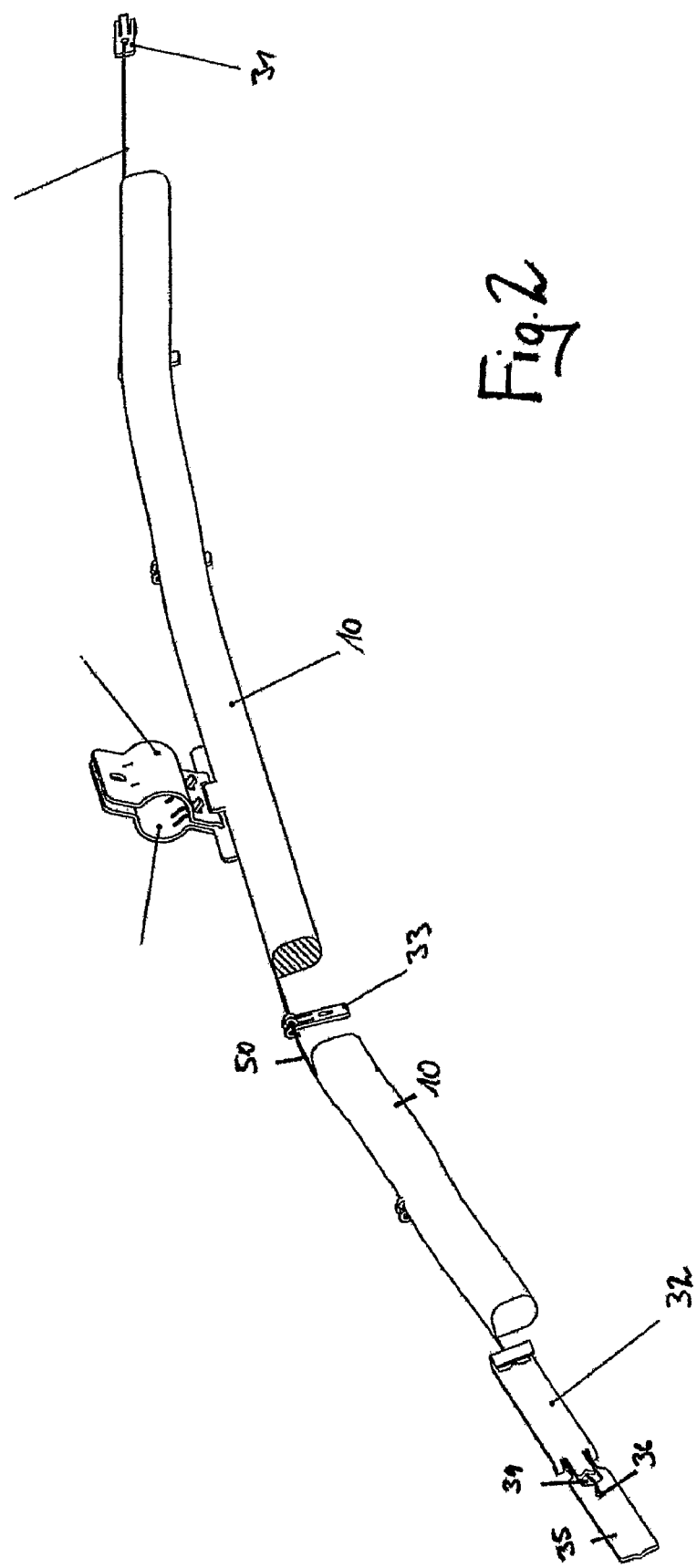

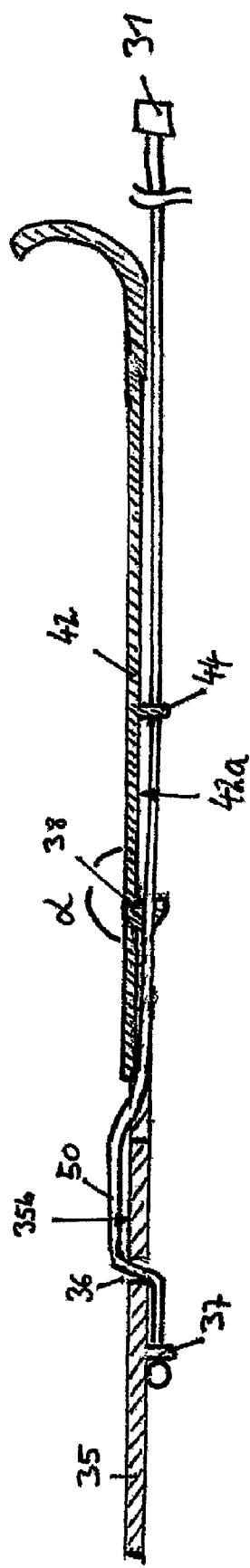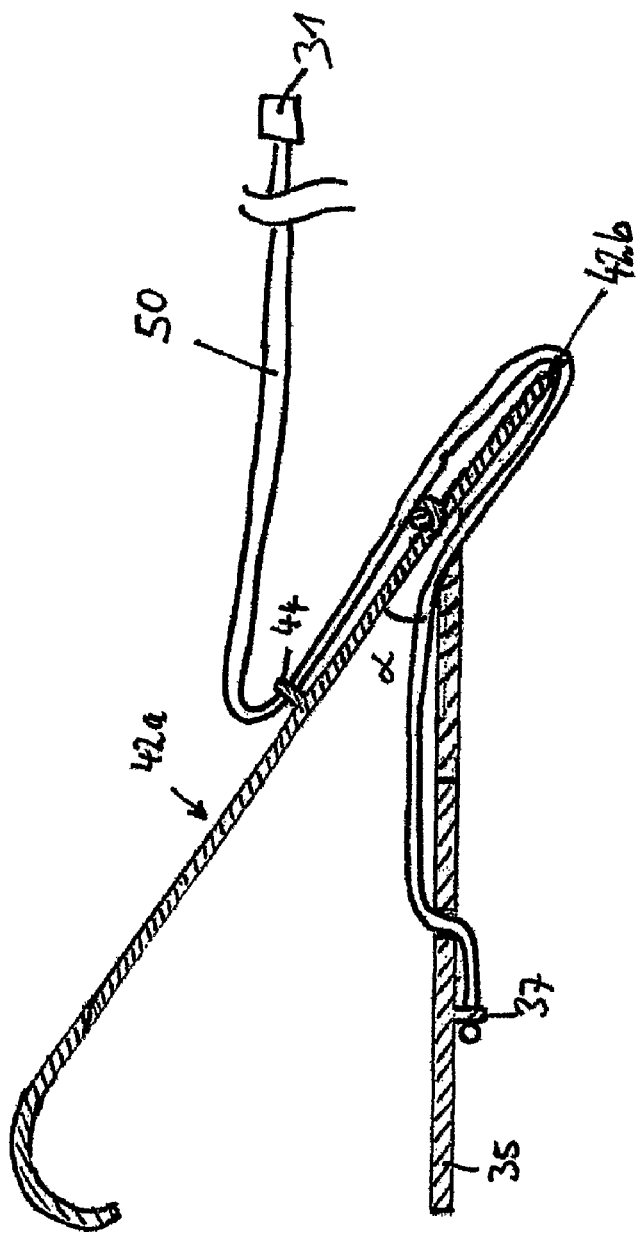

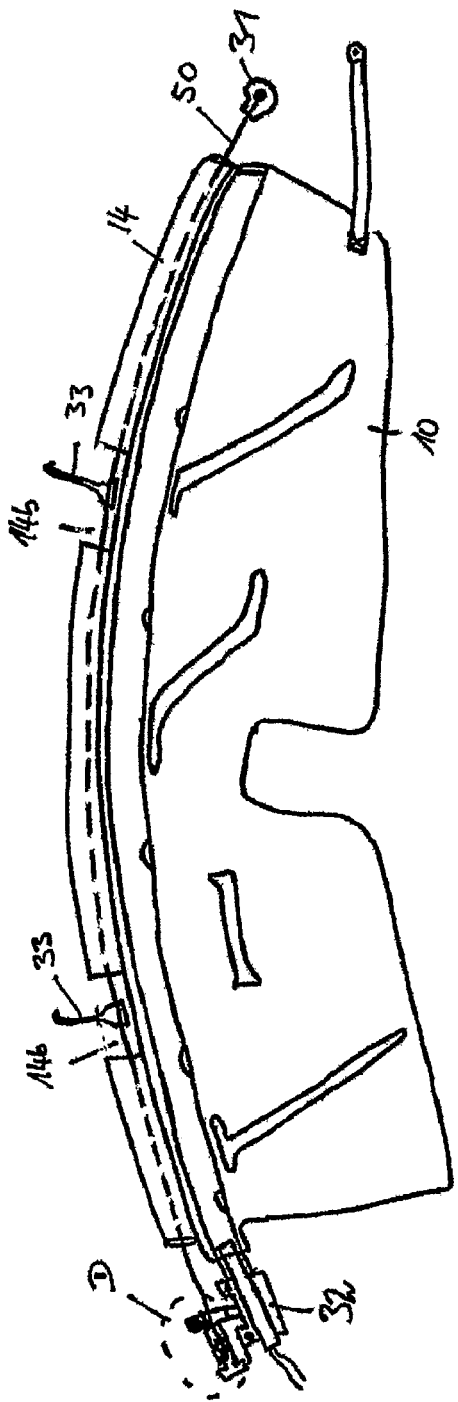
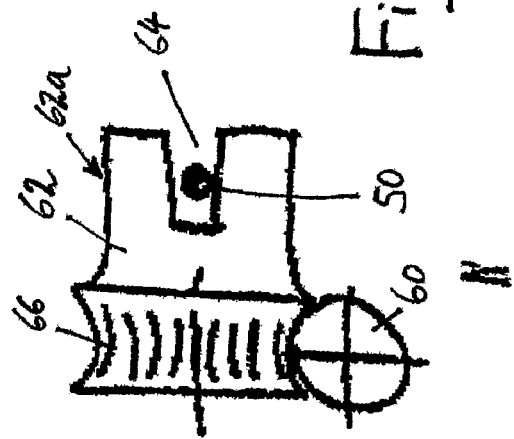
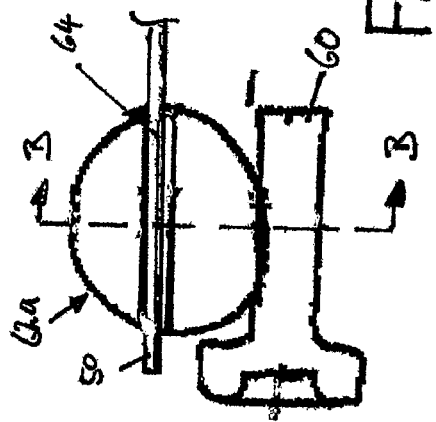

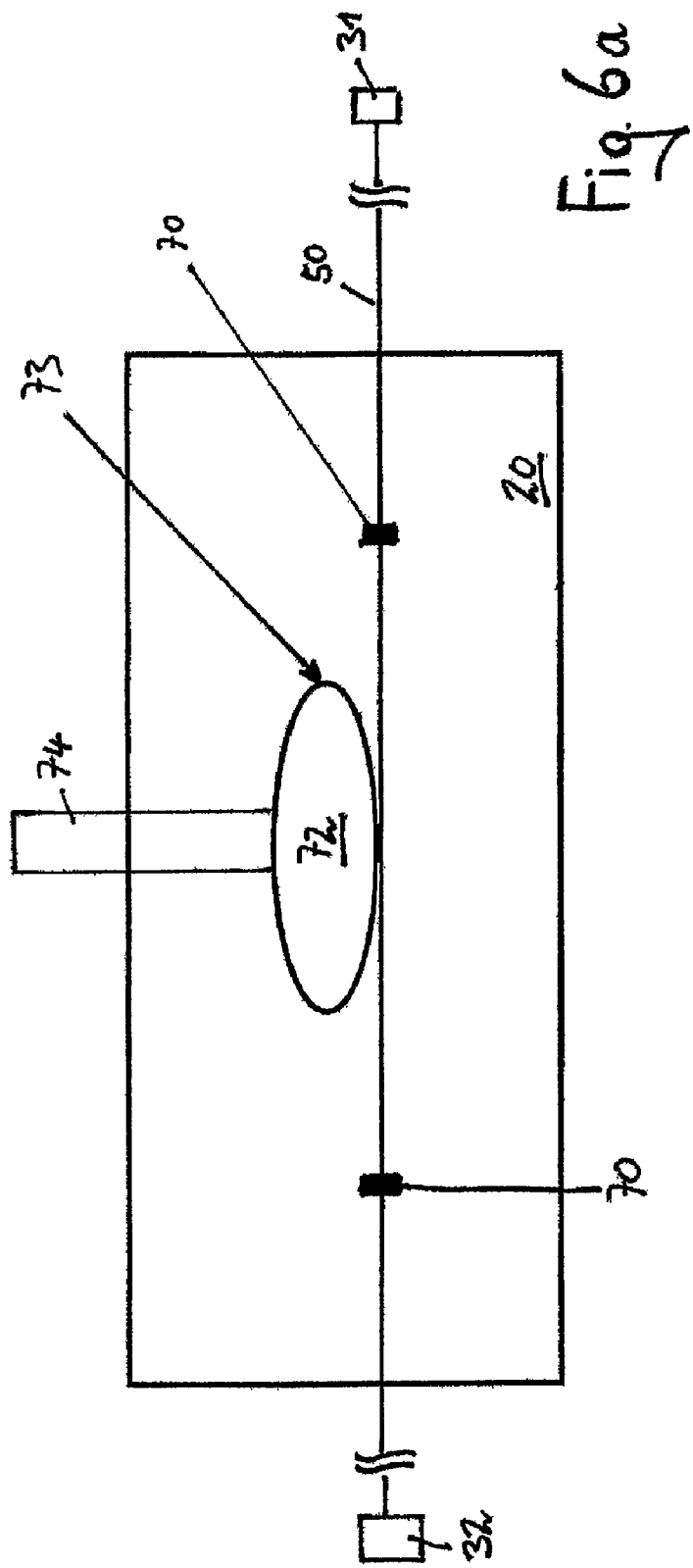

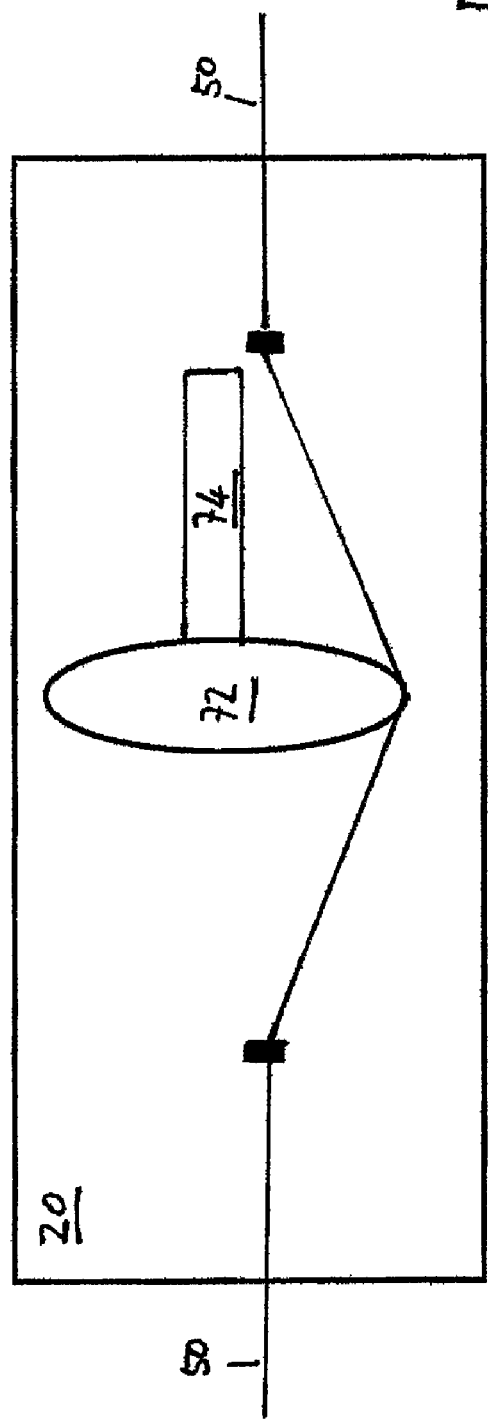

CURTAIN AIR BAG UNIT

The invention concerns a curtain air bag unit according to claim 1.

In order to protect the passengers during a side crash or during a roll-over crash so-called curtain air bags are known. Such curtain air bags are attached at or next to the roof bar of the vehicle and expand in case of operation in such a way that they cover at least a part of the side windows and mostly also the B-column of the vehicle. Fixing means which join the upper edge of the curtain air bag with the inner structure of the vehicle must be present.

For example from the U.S. Pat. No. 5,899,486 a curtain air bag unit is known, whose fixing means comprise a tension member in the form of a wire. This wire extends from a first fixing element joined with the inner structure of the vehicle to a second fixing element joined with inner structure of the vehicle and that extends through a long, round tube section of the air bag which is connected to the section of the air bag which expands in the case of work of the gas generator.

A very uniform connection of the air bag to the motor vehicle is achieved by the construction chosen in the U.S. Pat. No. 5,899,486. Because no section of the airbag is being joined directly and rigidly to the inner structure of the vehicle a breaking of the fabric can surely be prevented during the expansion even under unfavorable circumstances.

A disadvantage of the suggested construction is, that a high-quality mounting of the needed wire is difficult. If a precut wire is used, following problem occurs: In the mounted state the wire should show a relatively high tensile stress in order not to sag and not to produce any rattle noises. To achieve that it must be as short as possible that makes the mounting of the wire very difficult. If a longer wire is chosen, the mounting is simpler but no optimal functioning can be achieved. If no precut wire is used, length and tension of the wire will usually vary considerably from vehicle to vehicle, what is problematic from the viewpoint of a constantly high quality.

In view of the above-described circumstances, it is an object of the present invention, to provide a curtain air bag unit that can simply be installed in the vehicle with a high quality being achieved.

In accordance with the present invention, a tensioning means for influencing the tensile stress of the tension member is provided. The following can be reached by that measure: A pre-cut tension member can be used whose length is chosen in a way that the mounting in the vehicle can be carried out simply and conveniently. In a next step the tensioning means is actuated according to a simple installation instruction. This brings the tension member onto a desired, relatively high tensile stress level. One achieves therefore both: A simple way of mounting of the tension member and the high tensile stress wanted.

The tension member can be formed as a cable, a cord or a strip which could be metallic, could be made of plastic or fabric.

The invention is explained now in detail by ways of examples with respect to the accompanying figures. These figures show:

FIG. 1 A side air bag which is attached to a passenger car by means of a cable,

FIG. 2 a first embodiment of the invention in which one fixing element is set up as a tensioning lever, FIG. 3a the tensioning lever of FIG. 2 in opened position in a longitudinal sectional representation, FIG. 3b the tensioning lever of FIG. 3a in half locked position, FIG. 4 a second embodiment of the invention in with which one fixing element is set up as an infinitely variable tensioning means, FIG. 5a the detail D of FIG. 4 in a top view, FIG. 5b a sectional view along the line B-B of FIG. 5a, FIG. 6a a tensioning means which is located between the two fixing elements in open position, FIG. 6b the tensioning means of FIG. 6a in a locked position.

FIG. 7a the tensioning means is formed as a clipped fixing element

Figure 7B:
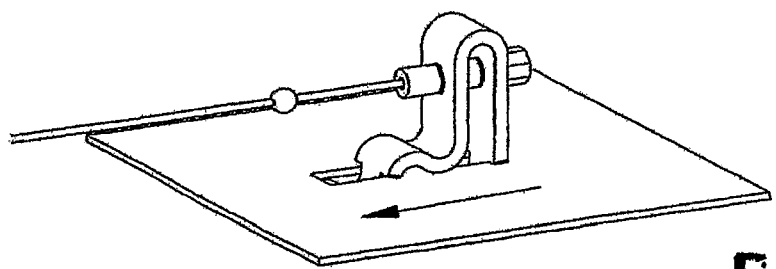

FIG. 7b the clipped fixing element during mounting to roof bar structure

Figure 7C:
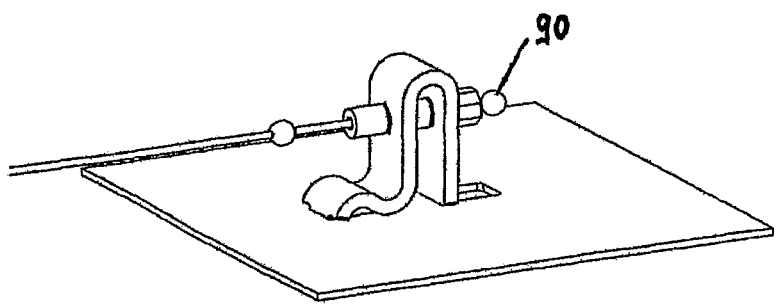

FIG. 7c the clipped fixing element of FIG. 7b in a subsequent step of mounting

Figure 7D:
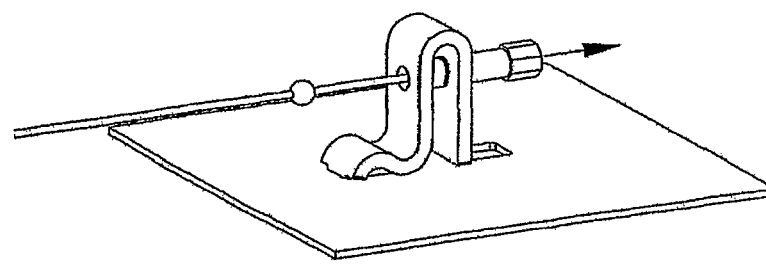

FIG. 7d the clipped fixing element of FIG. 7c in mounted condition

The FIG. 1 shows a curtain air bag unit. The curtain air bag unit comprises an air bag 10 and fixing means for mounting the air bag 10 in the area of the roof bar RB of the motor vehicle. The air bag 10 extends along a longitudinal axis L which coincides with the longitudinal axis of the motor vehicle. The air bag 10 comprises an expansion section 12 and a tube section 14. The expansion section 12 is connected to a gas generator (not shown) and is filled with gas in case of an accident. The tube section 14 is located at the upper rim of the air bag 10 and is used for receiving a cable 50 extending along the longitudinal axis L. The cable 50 is the tension member. The cable 50 is the part of the fixing means and extend between the fixing elements 31, 32 that are located at or next to the A-column A and the C-column C respectively. The air bag covers the side windows and the B-column. Tethers 16, which are attached to the A- and C-column, position the expanded air bag 10 correctly in the vehicle and control its tension in inflated condition.

As already mentioned the cable 50 is part of the fixing means that attach the air bag 10 to the motor vehicle. The cable 50 extends from the first fixing element 31 to the second fixing element 32 and is in sections received in the tube section 14. Further the fixing plate 20 and intermediate hooks 33 provide guiding of the cable 50 between the two fixing elements 31,32. The fixing plate 20 can for example be used for mounting of the gas generator. The tube section 14 has gaps 14b in that the intermediate hooks 33 reach. Such hooks 33 are secured to the cable 50 and are associated to apertures in the side structure of the vehicle. Alternatively the hooks 33 can be formed in the side structure, for example as bent tabs, on which the cable is hooked up.

According to the invention a tensioning means is present, by means of which the tensile strength in the cable 50 can be influenced. There are many kinds of possibilities how the tensioning means can be designed and located. In particular one of the two fixing elements 31,32 can be formed as the tensioning means. Further the tensioning means can be located between the two fixing elements 31,32, preferably at the fixing plate 20.

In the following three embodiments are described in detail. In the first two embodiments the second fixing element is also the tensioning means; In the case of the third embodiment the tensioning means is mounted between the two fixing elements.

FIRST EMBODIMENT

A first embodiment is shown in FIG. 2. In this embodiment the second fixing element 32 is designed as a tensioning lever representing the tensioning means. The construction of the tensioning lever is now described in detail with regard to the FIGS. 2 and 3a. The tensioning lever 34 comprises a stationary arm 35 which is secured to the inner structure of the motor vehicle. At the stationary arm 35 the final eye 37 is fixed. The end of the cable 50 is held in this final eye. Via the joint 38 the movable arm 42 is connected to the stationary arm 35. In the opened state as shown in the FIGS. 2 and 3a the angle α between the two arms 35,42 is about 180°.

The cable 50 extends from the already mentioned final eye 37, that is located at the bottom of the stationary arm 35, through the boring 36 onto the top face 35b of the stationary arm. From here the cable 50 extends through the aperture 39 to the bottom 42a of the movable arm 42 and runs through the routing-eye 44. From this point the cable 50 extends to the first fixing element 31.

When the movable arm 42 is slued, that means when the angle α is reduced, the tip 42b deflects the cable 50. The cable now extends from the boring 36 to the tip 42b and from here back to the routing-eye 44, where it is bent again. Consequently, the overall length of the path between the first fixing element 31 and the final eye 37 of the second fixing element 32 is increased, that is, the cable is tightened. In completely locked position the two arms 35,42 enclose an angle of essentially 0°. A blocking means can be present, with which the second arm 42 can be blocked in this locked position. One advantage of this embodiment is that the tightening of the cable 50 can be achieved with a single movement of the hand.

SECOND EMBODIMENT

The FIGS. 4, 5a and 5b show a second embodiment of the invention. As in the first embodiment, the second fixing element 32 is used as tensioning means. The tensioning means is made in a way that the tensile stress in the cable 50 can be chosen continuously.

FIG. 5a which is the detail D from FIG. 4 shows the construction of the tensioning means schematically. Tensioning means of this kind are known, for example in guitars. The leveling screw 60 stands in working-combination with the teeth 66 of the package 62 (this can be seen particularly in FIG. 5b). So, in the case of a turn of the leveling screw 60 the package 62 is also turned. The package 62 shows a slot 64 through which the cable 50 is led. The twisting of the leveling screw 60 turns the package 62 and the cable 50 is wound onto the body surface 62a of the package 62 so that it is tightened like a guitar string.

By adjusting the tension in the cable 50 via a screw, the tension can easily measured during assembly and therefore such mounting concept is repeatable in identical manner with good quality. Further it is easily serviceable. By releasing the screw connection the air bag unit can be dismounted, if it needs to be replaced after an accident situation.

THIRD EMBODIMENT

The FIGS. 6a and 6b show a third embodiment. In this embodiment the tensioning means is located between the two fixing elements. For example the tensioning means can be mounted at the fixing plate 20, to which the gas generator can also be attached. At the fixing plate 20 the cam 72 is pivotably mounted. The lever 74 is rigidly attached to the cam 72. The cable 50 is guided by two rigid eyes 70 and passes the body surface of the cam 72. In the opened position represented in FIG. 6a, the cable 50 is not deflected by the cam 72. If, as shown in FIG. 6b, the lever 74 is turned 90°, the top 73 of the cam 72 deflects the cable 50 and the cable 50 is thus tightened.

As in the first embodiment, the tensioning of the cable 50 can be achieved with a single movement.

Also this embodiment is serviceable, if the air bag unit needs to be replaced after an accident situation. The locked lever 74 needs to be unlocked and the cam 72 is then removed and the cable looses tension, so that the air bag unit can be dismounted.

Such concept is further having the advantage that due to the lever 74, it can be prevented that the passenger car is assembled without correct mounting of the air bag unit. If the lever 74 is not locked and the cable is not tensioned, the trim of the columns and the roof can not be positioned correctly. Only in the locking position of the lever 74 such trims can be positioned and mounted in the interior of the passenger car.

FOURTH EMBODIMENT

FIG. 7a shows a fixing element 32, which is formed as a unshaped metallic clip bracket having two arms 81, 82. Both arms have a curved hook shape at their end portions 83, 84. Each arm is associated with an aperture 85, 86 in the roof bar structure 87 of the passenger car. The width of each end portion 83, 84 corresponds to the width of the apertures 85, 86. The main portion of each of the arms 81, 82 has a bigger width than the end portion 83, 84, which does not fit to in the apertures 85, 86. So the fixing element 32 is first inserted into the apertures with the end portions 83, 84 of its arms 81, 82, as can be seen in sequence of FIG. 7a to FIG. 7b. Subsequently it is moved in locking position with a movement along the roof bar structure 87, as shown in FIG. 7b. FIG. 7c shows the locked position of the fixing element 32.

The fixing element 32 is provided with an opening 92, 93 in each arm 81, 82. A hollow screw 89 extends through both openings 92, 93. The cable 50 extends through the hollow body of the screw 89 and through the openings 92, 93 in the fixing element. The head of the screw 89 is provided with a recess in which a stop ball 90 is located (shown in FIG. 7c). Another stop ball 91 is provided in the cable 50 at the opposite side of the fixing element 32. Both stop balls 90, 91 have the function to secure the cable end portion at the fixing element 32, so that it can not be removed from it. After insertion of the fixing element 32 into the roof bar structure 87 the cable 50 is tensioned by putting a defined torque at the screw 89 and therewith pulling the cable 50 through the fixing element 32 with a defined length.

This tensioning means can easily be dismounted by releasing the tension of the cable with the screw and removing the clip element 32 from the roof bar structure 87.

The invention claimed is:

1. A curtain air bag unit for a motor vehicle comprising:
    an air bag extending parallel to the longitudinal axis of the motor vehicle,
    fixing means for fixing the air bag in the area of a roof bar of the motor vehicle,
    wherein the fixing means comprise a tension member, that extends from a first fixing element to a second fixing element, and tensioning means for influencing the tensile stress of the tension member during mounting of the curtain air bag unit into the motor vehicle, and
    wherein one of the two fixing elements is also the tensioning means.

2. A curtain air bag unit according to claim 1, wherein the first fixing element is mounted in the area of a front column of the motor vehicle and the second fixing element is mounted in the area of a rear column of the motor vehicle.

3. A curtain air bag unit according to claim 2, wherein the first fixing element is mounted to the A-column of the motor vehicle and the second fixing element is mounted to the C-column of the motor vehicle.

4. A curtain air bag unit according to claim 1, wherein the airbag comprises an expansion section and a tube section, said tube section having gaps in which intermediate hooks reach in order to guide the tension member and/or to attach the tension member to the roof bar.

5. A curtain air bag unit according to claim 4, wherein the intermediate hooks are secured on the tension member.

6. A curtain air bag unit according to claim 4, wherein the intermediate hooks are formed in the roof bar structure.

7. A curtain air bag unit according to claim 1, wherein the tensioning means can be actuated by the movement of a lever.

8. A curtain air bag unit according to claim 1, wherein the tensioning means can be actuated by the movement of a leveling screw.

9. A curtain air bag unit according to claim 1, wherein the tensile stress of the tension member is increased in a last step of the mounting of the air bag.

10. A curtain air bag unit according to claim 1, wherein the tension member is formed from metal, plastic or fabric.

11. A curtain air bag unit for a motor vehicle comprising:
an air bag extending parallel to the longitudinal axis of the motor vehicle,
a tension member extending from a first fixing element to a second fixing element, wherein the air bag is coupled to the tension member to fix the air bag in the area of a roof bar of the motor vehicle via the fixing elements, and
a tensioning mechanism configured to influence the tensile stress of the tension member during mounting of the curtain air bag unit into the motor vehicle,
wherein the tension member, the fixing elements and the tensioning mechanism cooperate together in a manner that permits the fixing elements and the tensioning mechanism to be positioned only along the roof bar of the motor vehicle such that the tension member extends only along the roof bar of the motor vehicle.

12. A curtain air bag unit according to claim 11, wherein one of the two fixing elements is also the tensioning mechanism.

13. A curtain air bag unit according to claim 11, wherein the tensioning mechanism is located between the two fixing elements.

14. A curtain air bag unit according to claim 11, wherein the first fixing element is mounted in the area of a front column of the motor vehicle and the second fixing element is mounted in the area of a rear column of the motor vehicle.

15. A curtain air bag unit according to claim 14, wherein the first fixing element is mounted to the A-column of the motor vehicle and the second fixing element is mounted to the C-column of the motor vehicle.

16. A curtain air bag unit according to claim 11, wherein the airbag comprises an expansion section and a tube section, said tube section having gaps in which intermediate hooks reach in order to guide the tension member and/or to attach the tension member to the roof bar.

17. A curtain air bag unit according to claim 16, wherein the intermediate hooks are secured on the cable.

18. A curtain air bag unit according to claim 16, wherein the intermediate hooks are formed in the roof bar structure.

19. A curtain air bag unit according to claim 11, wherein the tensioning mechanism can be actuated by the movement of a lever.

20. A curtain air bag unit according to claim 11, wherein the tensioning mechanism can be actuated by the movement of a leveling screw.

21. A curtain air bag unit according to claim 11, wherein the tensile stress of the tension member is increased in a last step of the mounting of the air bag.

22. A curtain air bag unit according to claim 11, wherein the tension member is formed from metal, plastic or fabric.

* * * * *